(12) United States Patent
Wu et al.

(10) Patent No.: US 7,200,154 B1
(45) Date of Patent: Apr. 3, 2007

(54) QOS LINK PROTOCOL (QLP)

(75) Inventors: Geng Wu, Plano, TX (US); Hang Zhang, Nepean (CA); Mo-Han Fong, L'Orignal (CA); Jun Li, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1018 days.

(21) Appl. No.: 10/141,268

(22) Filed: May 8, 2002

Related U.S. Application Data

(60) Provisional application No. 60/293,469, filed on May 23, 2001.

(51) Int. Cl.
*H04J 3/16* (2006.01)
*H04J 3/22* (2006.01)
*H04J 1/16* (2006.01)
*H04Q 7/20* (2006.01)
*G01R 31/08* (2006.01)
*G06F 11/00* (2006.01)
*G08C 15/00* (2006.01)

(52) U.S. Cl. .............. 370/468; 370/252; 455/452.2

(58) Field of Classification Search ........ 370/468, 370/345, 330, 338, 310, 352, 328, 464, 335, 370/342, 401, 252, 332, 466, 329, 386, 375, 370/356, 394, 395; 455/439, 452.1, 515, 455/452.2, 448, 428, 432, 433, 436, 560; 359/118; 709/224, 249
See application file for complete search history.

(56) References Cited

U.S. PATENT DOCUMENTS

| 6,088,342 | A | | 7/2000 | Cheng et al. | |
|---|---|---|---|---|---|
| 6,115,372 | A | * | 9/2000 | Dinha | 370/352 |
| 6,353,907 | B1 | | 3/2002 | van Nobelen | |
| 6,418,148 | B1 | * | 7/2002 | Kumar et al. | 370/468 |
| 6,515,972 | B1 | * | 2/2003 | Gage et al. | 370/328 |
| 6,584,108 | B1 | * | 6/2003 | Chung et al. | 370/401 |
| 6,631,122 | B1 | * | 10/2003 | Arunachalam et al. | 370/332 |
| 6,654,363 | B1 | * | 11/2003 | Li et al. | 370/338 |
| 6,728,233 | B1 | * | 4/2004 | Park et al. | 370/342 |
| 2002/0109879 | A1 | * | 8/2002 | Wing So | 359/118 |
| 2002/0116545 | A1 | * | 8/2002 | Mandato et al. | 709/328 |
| 2002/0167907 | A1 | * | 11/2002 | Sarkar et al. | 370/252 |
| 2004/0013102 | A1 | * | 1/2004 | Fong et al. | 370/345 |
| 2004/0248583 | A1 | * | 12/2004 | Satt et al. | 455/452.2 |

* cited by examiner

*Primary Examiner*—Chi Pham
*Assistant Examiner*—Prenell Jones
(74) *Attorney, Agent, or Firm*—Trop, Pruner & Hu, P.C.

(57) ABSTRACT

A Quality of Service (QoS) Link Protocol (QLP) for use in a wireless telecommunications network. A plurality of data inputs are provided, each utilized for receiving packet data streams from respective applications over an IP network. Each of the applications has at least one QoS requirement. The QLP comprises a transmission confirmation receiving mechanism for receiving indications from mobile terminals whether data transmitted to the terminal has been successful. The QLP also has a plurality of automatic retransmission request (ARQ) units each coupled to an input for a packet data stream and to the transmission confirmation receiving mechanism, and which is responsible for transmitting each packet and retransmitting each packet if the packet was not transmitted successfully. Finally, the QLP comprises a QoS multiplexor that receives a data stream from each ARQ and adds header data to each packet for identifying the particular physical layer treatment for each packet in accordance with the QoS associated with the data stream. The QoS and the physical layer treatment are influenced by the status of the network.

31 Claims, 4 Drawing Sheets

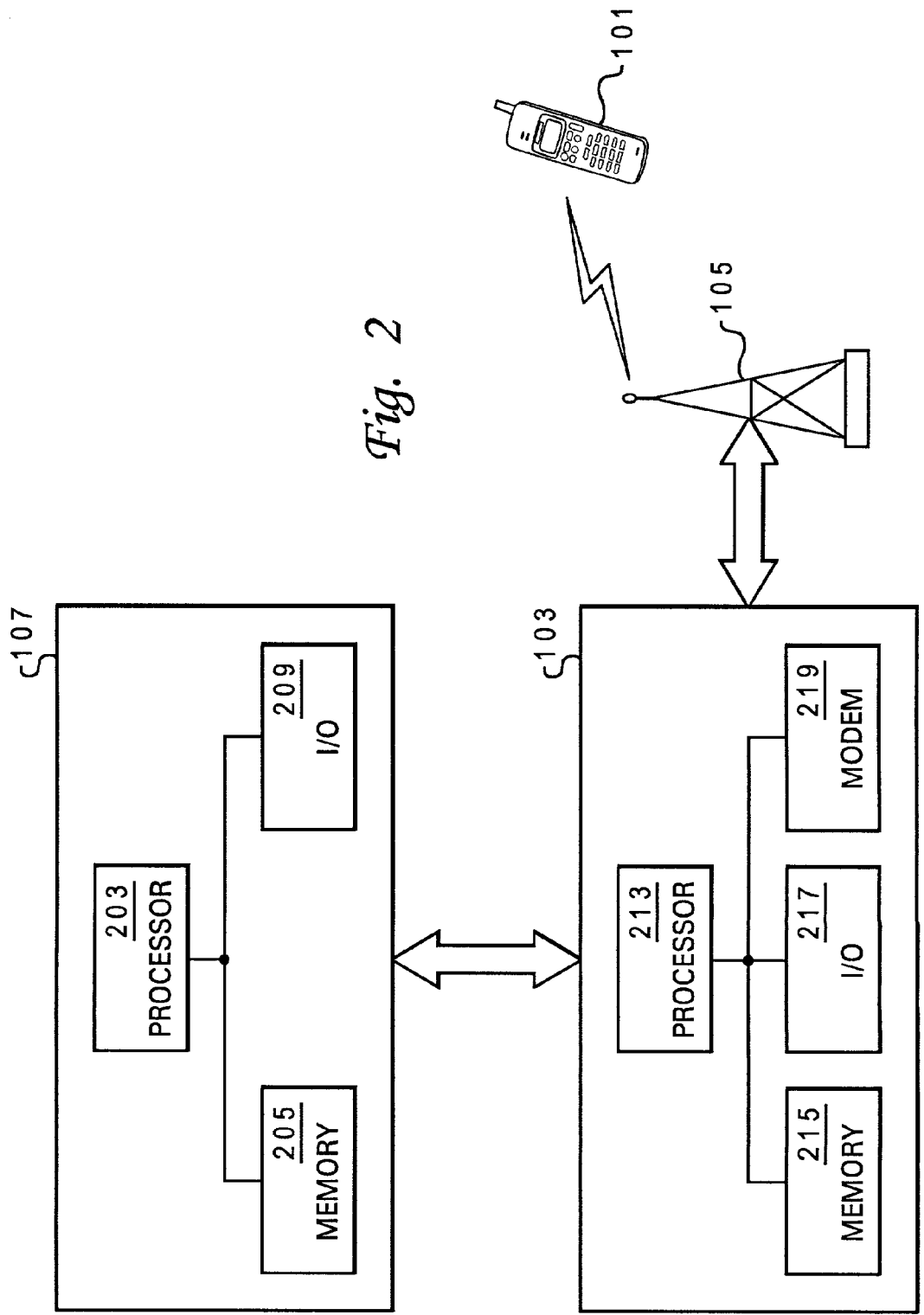

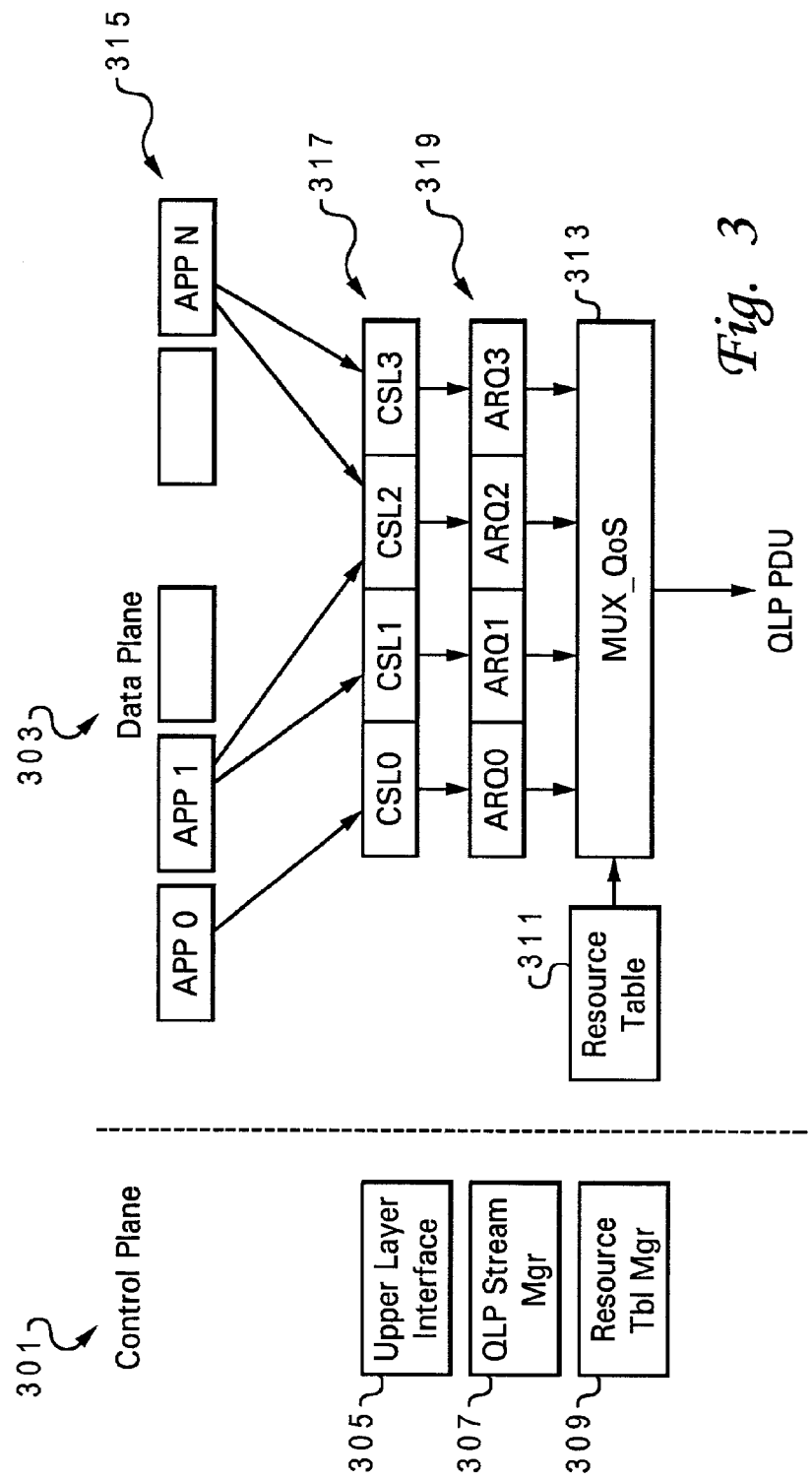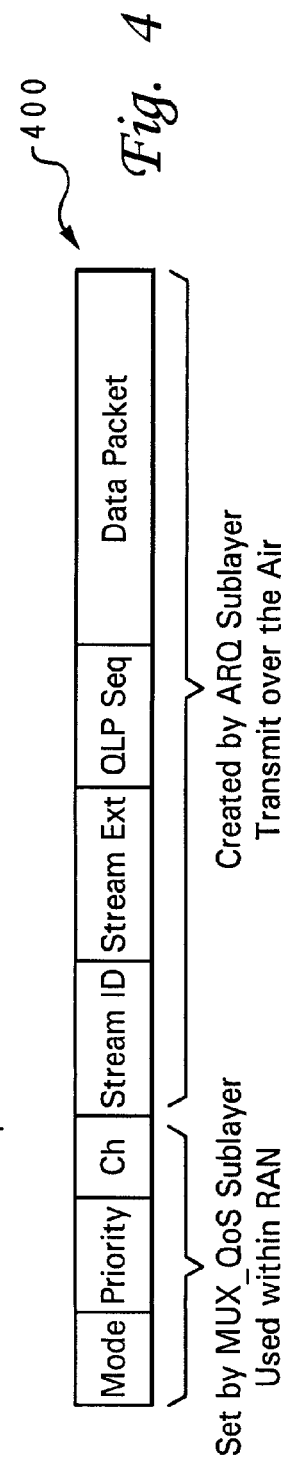

QOS LINK PROTOCOL (QLP)

PRIORITY APPLICATION

This application claims the priority filing date of Provisional Application Ser. No. 60/293,469 (Ref. No. 14634RRUS01P) filed on May 23, 2001, the content of which is herein incorporated by reference.

BACKGROUND OF THE INVENTION

1. Technical Field

The present invention relates generally to wireless communication networks and in particular to Quality of Service (QoS) within wireless communication networks. Still more particularly, the present invention relates to a method and system for providing a QoS-based link layer protocol within the air interface of a wireless communication network.

2. Description of the Related Art

The demand by consumers all over the world for wireless services continues to expand at a rapid pace and is expected to continue. Two major developments in the wireless industry are the introduction of multi-carrier transmission capabilities and support for data services in addition to the traditional voice services.

Within a wireless network, enabling communications between a base station and mobile unit involves various hardware and software components and implementation of a transmission protocol to define the characteristics of the communication. The transmission protocol typically manages different operations of the communications process including interaction between the protocol stack/layers, (i.e., physical, data, and network layers etc.). The protocol implemented also determines the efficiency with which the network is able to support multi-carrier operations and manage multiple application data streams simultaneously.

The developments within the industry led to the introduction of the third generation (3G) technology standards. One key aspect emphasized within 3G systems is quality of service (QoS). Third generation wireless networks need to support a wide range of applications that may require very different over-the-air QoS delivery. Most current wireless networks operate with a Radio Link Protocol (RLP) controlling the packet data transmission over the air interface between network communication units. The RLP, for example, provides for the reliable transfer of data across the physical link, such as sending blocks of data with the necessary synchronization, error control, flow control, and so forth. However, RLP has several limitations that directly affect efficient 3G network implementation.

For example, RLP was designed for providing simple error recovery and is not able to meet the increasing demand efficiently. Also, the existing RLP is inefficient in supporting multiple applications having different QoS requirements: Thus, multiple RLP instances are required to support multiple applications when the applications have different QoS requirements. Each RLP operates independently, and cannot take advantage of the existence of other RLP instances. For example, each idle RLP needs to send "keep-alive" packets to maintain its synchronization even when another RLP is fully active.

Adding/removing a QoS data stream within an RLP instance incurs a significant amount of overhead because network resources have to be allocated and the RLP has to go through a new synchronization process. This is troublesome for bursty packet data support where applications may be launched and terminated rather frequently.

Other limitations exists with RLP implementation. RLP has limited support for priority marking. (The marking actually happens outside of the RLP). RLP does not have a mechanism to support dynamic Layer 2 (data link) to Layer 1 (physical) mapping which is essential in the multi-carrier, adaptive modulation and coding air interface environment.

Unfortunately, service support with current 3G systems still rely on traditional Radio Link Protocol (RLP) (within the communication protocol stack) to provide the over-the air interface for these new services. As noted above, this reliance has held back further development in 3G technology.

The present invention recognizes that it would be desirable to provide a method and system for implementing a QoS-based RLP that enables dynamic QoS support for multiple applications requiring air-interface links with different QoS requirements. A method and system for eliminating the problems associated with RLP in dealing with placing/supporting multiple simultaneous applications over the air transmission interface would be a welcomed improvement. These and other benefits are provided by the invention described herein.

SUMMARY OF THE INVENTION

Disclosed is a Quality of Service (QoS) Link Protocol (QLP) for use in a wireless telecommunications network. A plurality of data inputs are provided, each utilized for receiving packet data streams from respective applications over an IP network. Each of the applications has at least one QoS requirement. The QLP comprises a transmission confirmation mechanism for receiving indications from mobile terminals whether data transmitted to the terminal has been successful. The QLP also has a plurality of automatic retransmission request (ARQ) units each coupled to an input for a packet data stream and to the transmission confirmation receiving mechanism, and which is responsible for transmitting each packet and retransmitting each packet if the packet was not transmitted successfully. Finally, the QLP comprises a QoS multiplexor that receives a data stream from each ARQ and adds header data to each packet for identifying the particular physical layer treatment for each packet in accordance with the QoS associated with the data stream. The QoS and the physical layer treatment are influenced by the status of the network.

The above, as well as additional objects, features, and advantages of the present invention will become apparent in the detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2 is a block diagram depicting processing and signaling components of a wireless communication network within which the QLP is implemented in accordance with the invention;

FIG. 3 is a block diagram illustrating the control and data planes of a QLP protocol supporting multiple applications in accordance with one embodiment of the invention;

FIG. 4 is a block diagram of a transmission packet created according to QLP standards in accordance with one embodiment of the invention.

DETAILED DISCLOSURE OF ILLUSTRATIVE EMBODIMENTS

In the following description of the exemplary embodiment, reference is made to the accompanying drawings which form a part hereof, and in which is shown, by way of illustration, specific embodiments by which the invention may be practiced. It is to be understood that other embodiments may be utilized as structural changes may be made without departing from the scope of the present invention.

The present invention provides a QoS Link Protocol (QLP) that is capable of efficiently supporting multiple QoS data streams over the air. The QLP also enables multi-carrier adaptive modulation and coding of the physical layer and also provides better interface to upper layers.

Figure 1:
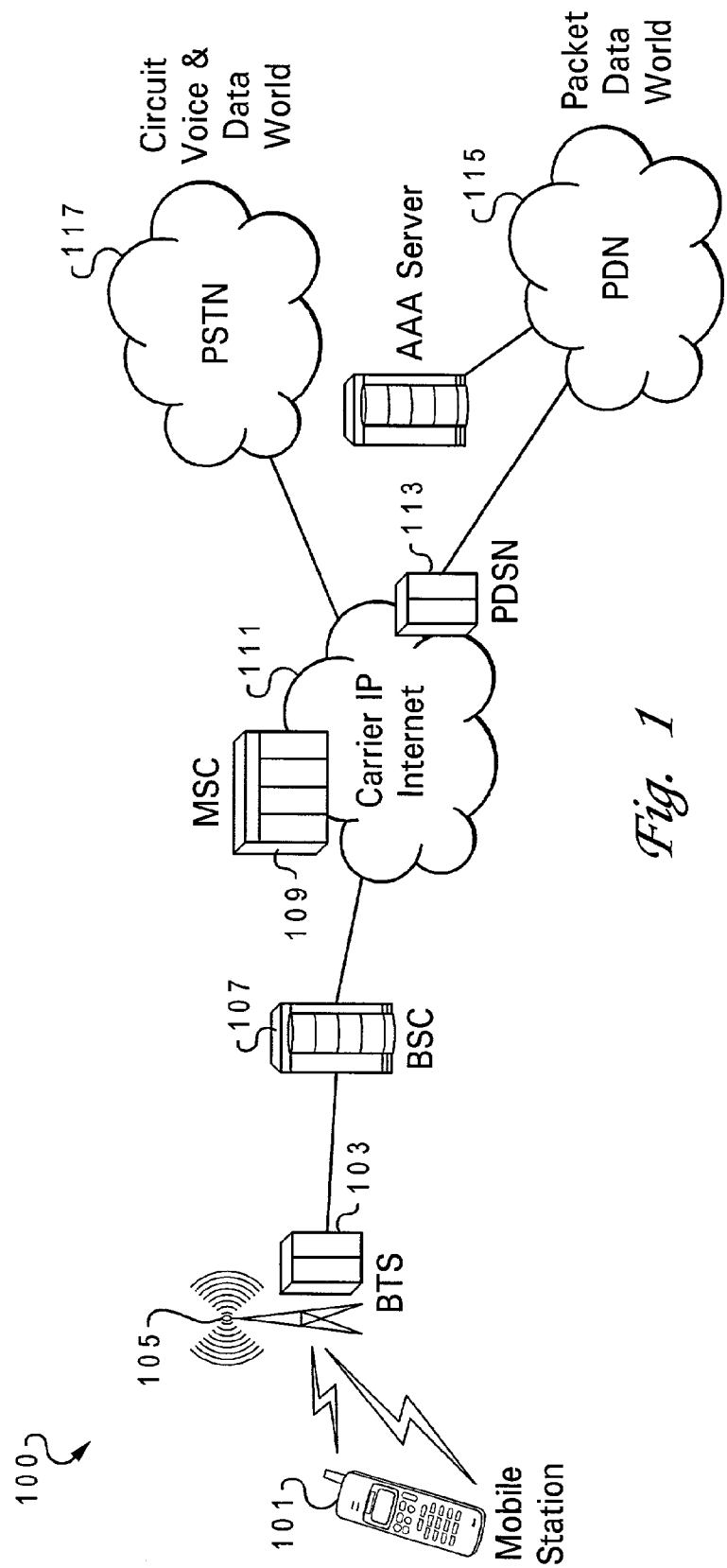
FIG. 1 is a diagram illustrating a multi-carrier communication network that supports transmission of multiple application types over a wireless air interface and within which features of the invention may advantageously be implemented.

Referring now to the figures and in particular with reference to FIG. 1, there is illustrated a multi-carrier communications network 100, within which features of the invention may be practiced. As illustrated network 100 includes both wireless and wired components. Wireless components of network 100 include mobile station 101, base station transceiver subsystem (BTS) 103, (and associated antenna 105) base station controller (BSC) 107, packet data service node (PDSN) 113, and mobile switching center (MSC) 109.

BSC 107 is connected to landline public switched telephone network (PSTN) 117 through the MSC 109 and packet data network (PDN) such as Internet 115 via the PDSN 113. MSC 109 provides a connection to landline trunks when the mobile station 101 is involved in a call. PDN 115 and PSTN 117 provide data and a combination of data and voice signals, respectively, for transmission within network 100.

The described embodiment of the invention is primarily applicable to wireless data transmissions and thus the wireless components of network 100. However, it is contemplated that various features of the invention are also applicable to other types of data transmission and thus may be implemented in any communication network that supports multiple simultaneous data streams, each having specific QoS requirements.

Returning now to FIG. 1, both base station 103 and mobile station 101 receive and transmit signals via various hardware and software components (including antenna) utilizing QLP on the air interface. According to the invention, these signals typically include a combination of signaling information, speech, data, and/or packet data. The invention provides updates to the hardware and software components to enable these various signal types to be transmitted according to the QLP air interface standard.

FIG. 2 is a block diagram illustrating the processing and signaling components of BTS 103 and BSC 107 of FIG. 1. Although not specifically shown, base station 103 includes the necessary transmitters and receivers to allow signal exchange with mobile station 101. The BTS 103 is coupled to antenna 105 and generates the signals transmitted over the air interface by antenna 105.

FIG. 2 also illustrates an exemplary configuration of a data processing system of base station controller 107. A typical data processing system in the BSC 107 comprises a processor 203 that controls (i.e., executes) the software coded operations of the present invention. Coupled to processor 203 are memory 205 and Input/Output (I/O) devices 209. During standard operation, this data processing system (which may be a component part of a router, switch, and/or switching center) controls/manages radio resource allocation and other communication features of CDMA network 100.

During traffic transmission or reception, access to a carrier frequency for completing a communication is controlled by BTS 103. In a preferred embodiment, software coded features of the present invention are stored in memory 215 and executed on processor 213. Results generated from processor 213 during execution of the software code of the invention are then provided to modem 219, which operates to generate or receive the required radio signals. Air transmission of the traffic is completed via antenna 105 that is coupled to base station 103.

The invention provides efficient over-the-air QoS support by supporting multiple QoS streams with one QLP entity. Consequently, the coordination of data packet delivery according to their QoS is highly effective. More precisely, individual QoS streams can be added or dropped without requiring creating/releasing a new RLP instance.

A set of functional features of the QLP is provided. Included among these features are the following: (1) Once the QLP is set up and properly maintained, there is no need for RLP to re-sync as the number of QoS stream changes; (2) QLP can apply different Automatic Re-transmission Requests (ARQ) schemes, including pass-through, without ARQ function, to each QoS stream according to the stream's QoS requirements; (3) QLP services both PPP/HDLC and Internet Protocol (IP) layers; (4) QLP is designed to support dynamic layer 2 (data link) to layer 1 (physical) mapping and is therefore highly efficient with adaptive modulation and coding technology.

Implementation of QLP also reduces operation complexity and resource management overhead because multiple RLP instances are integrated into one QLP implementation. Notably, when being implemented, QLP replaces the existing RLP design throughout the network, although individualized use of QLP is possible for a base station.

FIG. 3 illustrates one embodiment of a QLP instance for forward direction traffic. As shown in the figure, a QLP instance consists of control plane 301 and data plane 303. Control Plane 301 includes 3 entities, the upper layer interface 305, QLP stream manager 307, and resource table manager 309. The upper layer interface 305 is responsible for receiving service requests from the upper layer(s), identify the QoS requirement of a particular user data stream, and issuing commands to the QLP Stream Manager 307 for the creation or release of a QoS data stream.

The QLP Stream Manager 307 is responsible for QLP internal operation and peer-to-peer communication with its counterpart at the mobile station. Upon receiving the command from the upper layer interface 305, the QLP Stream Manager 307 will create/release a data stream and inform its peer of its internal resource mapping decisions.

Finally, the resource table manager 309 receives regular updates from the physical layer (within the BTS) on resource availability and queuing delay of each physical channel. Based on the received information and other system parameters, resource table manager 309 sets resource table 311, which is to be utilized by the MUX_QoS 313 to dispatch packets and set their priority in real-time.

Data Plane 303 consists of 3 sub-layers, convergence sub-layer (CSL) 317, ARQ layer 319, and MUX_QoS layer 313. Providing inputs to CSL 317 are multiple data streams 315 of applications requiring transmission. Each QLP can support up to 4 data streams. The CSL 317 interfaces to applications/service options. Although each data stream 315 may typically correspond to an individual application or service option, an application can also produce multiple data streams, each of which has a distinct set of QoS requirements. When this condition occurs, each CSL 317 is mapped to an IP QoS stream instead of to a particular application. Note that IP flow classification according to each packet's QoS requirements is above the QLP and is therefore outside of the scope of this invention.

Each user/terminal typically has one QLP instance, although more than one QLP per user is also allowed. For the reverse direction, the traffic goes backwards, and the MUX_QoS 313 performs packet routing instead of Layer 2 to Layer 1 mapping.

QLP peer-to-peer signaling allows the use of both an in-band and out-of-band approach. If in-band signaling is utilized, Stream 0 may be used and other layer 3 over-the-air signaling may also share this stream. Stream 0 can be dedicated for signaling purpose (similar to 1xEV-DO) or can be shared with other applications. When shared with other applications, CSL0 includes a special MUX_QoS function to ensure proper signaling message delivery. For out-of-band signaling, a separate signaling data path is required. This can be achieved in a way similar to 1xRTT where signaling messages between the base station and the mobile station are sent over as air interface control packet outside of the RLP data streams.

In operation, QLP accepts two types of data stream, (Point-to-Point Protocol) PPP over HDLC (High-Level Data Link Control) for efficient over the air delivery, and individual IP packets. In the later type of data stream (i.e., IP packets), IPAL is utilized for zero padding and multiplexing small packets if needed. Each user is typically provided with one QLP instance. QLP however, supports multiple streams of user data/applications and thus more than one QLP per user is permitted.

QLP employs scalable size PDU, which can be N times the fixed QLP_Base_Size. The base QLP packet is designed for efficient Voice Over IP (VoIP) transmission. That is, the QLP_Base_Size is small enough for VoIP packets. QLP uses QLP packet count instead of data octets count as sequence number. QLP also employs different ARQ (Automatic Retransmission reQuest) mechanism (NAK or ACK) or no ARQ at all (for voice) for each stream of data according to their QoS requirements.

To facilitate the scheduling operation at the Physical Layer, each QLP PDU (Protocol Data Unit) carries a priority indicator. The value of this priority indicator is set according to a set of QoS requirements from among: (1) user's overall QoS class; (2) application's QoS requirements; (3) current data transmission condition (e.g., queue occupancy level); and (4) scheduler feedback (e.g., scheduler may request all QLP to lower the priority of its low QoS class packet when its resource is running tight).

FIG. 4 illustrates a general QLP PDU. QLP PDU 400 includes a first set of three parameters that are set by the MUX-QoS sublayer and are utilized within RAN. These parameters are mode, priority, and channel (Ch). Mode indicates if the packet has to be sent over a particular physical channel. If the packet has been sent over the particular physical channel, the Ch field is utilized to identify that physical channel. Priority indicates the packet's priority according to its QoS requirement, user's QoS class, and BTS's loading condition. Priority may also serve as part of a flow control mechanism. Finally, Ch indicates the required or preferred physical channel resource, depending on the setting of the Mode field. These fields are used for layer 2 and layer 1 communication only and are not transmitted over the air.

QLP PDU also comprises a set of fields that are created by the ARQ sublayer 319 and that are transmitted over the air interface. This transmitted set of fields includes Stream ID, Stream Ext (stream extension field), QLP Seq (QLP sequence number), and data packet. Stream ID identifies the particular stream. Stream Ext is a field that can be activated during the initial stream setup and is utilized to carry stream specific information to facilitate the QoS delivery. QLP Seq is the QLP sequence number, and Data Packet is the actual payload/data.

Figure 5:
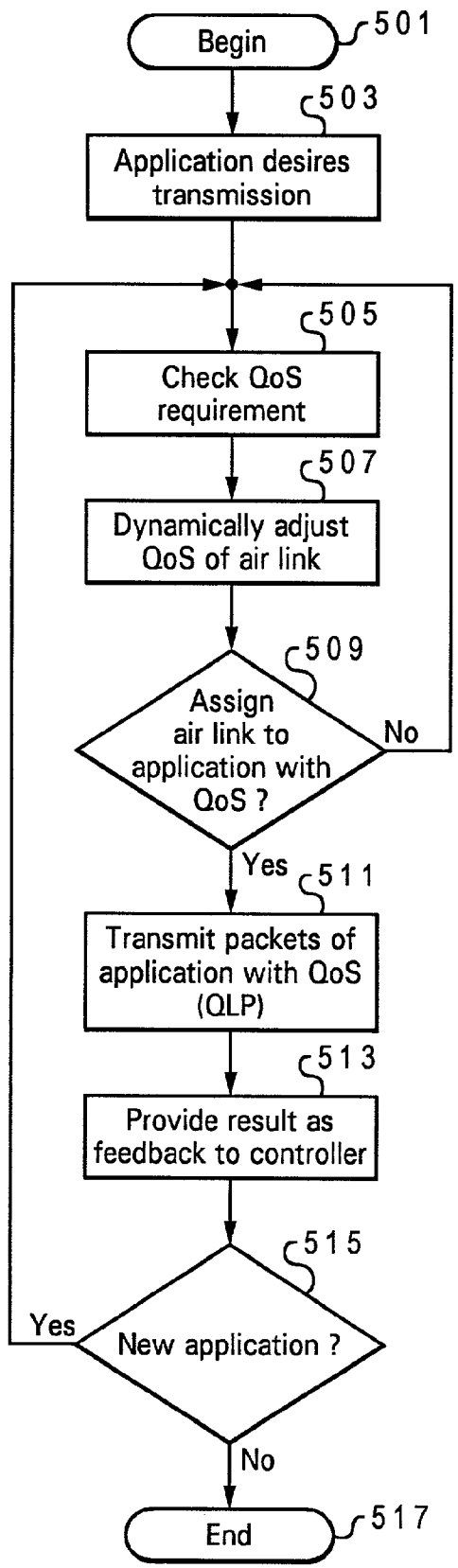
FIG. 5 is a flow chart illustrating the process of utilizing QLP to dynamically assign air-link channels to multiple applications with different QoS requirements in accordance with one embodiment of the invention.

FIG. 5 is a flow chart illustrating the process of providing QoS support to a data stream transmitted over the air interface. The process begins as shown at block 501 and thereafter, an application's data stream is received at the base station for transmission as indicated at block 503. The data stream has a particular QoS requirement indicated therein. The QLP logic checks the QoS requirement of the data stream and the current network conditions as shown at block 505. The QLP logic then dynamically adjusts the QoS of the air link (layer 1) to reflect that desired by the data stream as shown in block 507. This adjustment is completed irrespective of the number of streams currently being transmitted and their particular QoS requirements. However, these characteristics may affect the network conditions and the effect the network conditions have on the actual adjustments made. A determination is made at block 509 whether to assign an air link channel to the data stream (i.e., whether or not there is a channel available). At this point, additional physical layer channels may be set up between the base station and the mobile station if the physical layer resource currently in use cannot meet the additional application's QoS requirements. If the air link channel is assigned, the packets of the data stream are transmitted on the air link with the particular QoS as depicted at block 511. The effects of the new assignment, as well as previous assignment still being transmitted is fed back to the QLP controller, which tracks network conditions as indicated at block 513. A determination is then made, as shown at block 515, whether a new application data stream is present for assignment, and, when no new application data stream is present, the process ends as shown at block 517.

QoS is a key aspect of 3G. This invention attempts to address a fundamental technology issue in QoS support in a 3G-Evolution air-interface. It provides an efficient over-the-air QoS delivery and seamless interface to IP QoS. A successful implementation of this invention may dramatically simplify the over-the-air support for multiple applications that require multiple levels of QoS delivery.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution.

Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A system for providing differing QoS to multiple data streams transmitted on an air interface of a communications network, wherein each data stream has its own respective QoS requirement, said system comprising:
 data plane logic for simultaneously transmitting multiple data streams;
 QoS link layer protocol (QLP) logic for implementing dynamic allocation of network resources to each of said multiple data streams, wherein each of said data streams is allocated resources consistent with a QoS requirement for that particular data stream, wherein said particular data stream is transmitted with a QoS over said air interface that is reflective of said QoS requirement; and
 a resource manager to receive updates from a physical layer of the system,
 wherein the QLP logic adjusts the QoS assigned to said particular data stream according to the updates.

2. The system of claim 1, further comprising means for receiving said multiple data streams.

3. The system of claim 2, wherein said multiple data streams include voice, data, images, and a combination of voice and data.

4. A system for providing differing QoS to multiple data streams transmitted on an air interface of a communications network, wherein each data stream has its own respective QoS requirement, said system comprising:
 data plane logic for simultaneously transmitting multiple data streams;
 QoS link layer protocol (QLP) logic for implementing dynamic allocation of network resources to each of said multiple data streams, wherein each of said data streams is allocated resources consistent with a QoS requirement for that particular data stream, wherein said particular data stream is transmitted with a QoS over said air interface that is reflective of said QoS requirement; and
 a monitor for monitoring network operating characteristics including amount of current resource allocation, number of data streams being transmitted, and queuing of individual data streams;
 wherein said QLP logic adjusts a QoS assigned to said particular data stream based on said network operating characteristics and transmits each of said data streams over the air interface with a QoS based on said QoS requirement and said network operating characteristics.

5. The system of claim 1, wherein said communications network is a wireless network, wherein further:
 said QLP logic is implemented by hardware and software components of a base station of said wireless network.

6. The system of claim 5, wherein said QLP logic services both PPP over HDLC and IP layers.

7. A system for providing differing QoS to multiple data streams transmitted on an air interface of a communications network, wherein each data stream has its own respective QoS requirement, said system comprising:
 means for simultaneously transmitting multiple data streams; and
 a QoS link layer protocol (QLP) implementing dynamic allocation of network resources to each of said multiple data streams, wherein each of said data streams is allocated resources consistent with a QoS requirement for that particular data stream, wherein said data stream is transmitted with a QoS over said air interface that is reflective of said QoS requirement,
 wherein said QLP comprises a control plane and a data plane, said control plane comprising upper layer interface, means for managing a QLP stream, and means for managing a resource table, wherein said resource table is a component within said data plane utilized to dispatch packets and set a priority of said packets in real time.

8. The system of claim 7, wherein said means for managing said resource table receives an input comprising updates from the physical layer on resource availability and queuing delay of the physical channel, and said means for managing said resource table further comprises means for periodically updating said resource table based on said input.

9. The system of claim 7, wherein said data plane further comprises a plurality of convergence sub-layer interfaces that each receives inputs from said multiple data streams and forwards said inputs to a plurality of ARQs.

10. The system of claim 9, wherein said ARQs generate outputs which are forwarded to a QoS Multiplexor, which dispatches packets to the air interface with the required QoS adjusted based on an input from said resource table.

11. The system of claim 10, wherein said QoS Multiplexor generates a QLP protocol data unit (PDU) for transmission over said air interface, wherein said PDU is a fixed size PDU, which is N times a base size of a QLP packet that provides efficient voice over IP transmission.

12. The system of claim 11, wherein said PDU comprises a priority indicator, wherein said priority indicator is determined based on a plurality of QoS characteristics from among: user's overall QoS class; application's QoS requirements; current data transmission condition; and scheduler feedback.

13. The system of claim 1, wherein said QLP logic comprises a plurality of functional characteristics from among: utilization of QLP packet count in place of data octets count as a sequence number for said packets; and utilization of different ARQ mechanisms including no ARQ for voice for each stream of data according to a QoS requirement of said stream.

14. A method for providing dynamic QoS to multiple data streams being transmitted on an air interface of a communications network, said method comprising:
 providing a QLP protocol in a base station, said QLP protocol being implemented within the protocol layers of a network communication stack;
 executing said QLP protocol at said base station responsive to a receipt of a data stream to be transmitted over the air interface and having a particular QoS requirement, wherein said QLP protocol reads said QoS requirement; and
 responsive to said QoS requirement, dynamically adjusting hardware components of said base station to transmit said data stream over the air interface via an associated antenna with a QoS reflective of said QoS requirement.

15. The method of claim 14, wherein said providing step includes replacing a radio link protocol with said QLP.

16. The method of claim 14, wherein said executing step includes:
receiving multiple data streams concurrently;
monitoring network operating characteristics including an amount of current resource allocation, number of data streams being transmitted, and queuing of individual data streams; and
dynamically adjusting a QoS assigned to a data stream based on said network operating characteristics.

17. The method of claim 16, further comprising transmitting each of said data streams over the air interface with a QoS based on said QoS requirement and said network operating characteristics.

18. A multi-carrier communication network in which data streams transmitted on the air interface are dynamically provided efficient QoS allocation, said network comprising:
an air interface on which data streams are transmitted between communication terminals; and
at least one base station having:
    means for simultaneously transmitting multiple data streams over said air interface; and
    a QoS link layer protocol (QLP) implementing dynamic allocation of network resources to each of said multiple data streams, wherein each of said data streams is allocated resources consistent with a QoS requirement for that particular data stream, wherein said data stream is transmitted with a QoS over said air interface that is reflective of said QoS requirement,
wherein said QLP further comprises:
    monitoring means for monitoring network operating characteristics including amount of current resource allocation, number of data streams being transmitted, and queuing of individual data streams;
    wherein said QLP adjusts a QoS assigned to said data stream based on said network operating characteristics and transmits each of said data streams over the air interface with a QoS based on said QoS requirement and said network operating characteristics.

19. The network of claim 18, wherein said QLP further comprises:
a control plane and a data plane, said control plane comprising upper layer interface, means for managing a QLP stream, and means for managing a resource table, wherein said resource table is a component within said data plane utilized to dispatch packets and set a priority of said packets in real time; and
wherein said means for managing said resource table receives an input comprising updates from the physical layer on resource availability and queuing delay of each physical channel, and said means further comprises means for periodically updating said resource table based on said input.

20. A Quality of Service (QoS) Link Protocol (QLP) for use in a wireless telecommunications network comprising:
receiving means for receiving application data streams, each having a unique QoS requirement;
means for evaluating said unique QoS requirement of each of said multiple application data streams;
means for concurrently transmitting each of said multiple data streams out to the air interface, wherein each data stream is transmitted with a QoS that is reflective of its unique QoS requirement; and
wherein each data stream may be dynamically added and dropped from being transmitted without requiring a new air interface link protocol instance.

21. The QLP of claim 20, further comprising means for applying a different ARQ scheme to each of said multiple data streams based on said unique QoS requirement, wherein said ARQ includes pass-through.

22. The QLP of claim 20, further comprising:
means for monitoring network characteristics from among resource allocation, queuing of individual data streams, and number of data streams currently deployed; and
means for dynamic adding and dropping individual data streams based on said network characteristics.

23. The QLP of claim 20, wherein said QLP comprises a control plane and a data plane, said control plane comprising upper layer interface, means for managing a QLP stream, and means for managing a resource table, wherein said resource table is a component within said data plane utilized to dispatch packets and set a priority of said packets in real time.

24. The QLP of claim 23, wherein said means for managing said resource table receives an input comprising updates from the physical layer on resource availability and queuing delay of each physical channel, and said means further comprises means for periodically updating said resource table based on said input.

25. The QLP of claim 24, wherein said data plane further comprises a plurality of convergence sub-layer interfaces that each receives inputs from said multiple data streams and forwards said inputs to a plurality of ARQs.

26. The QLP of claim 25, wherein said ARQs generate an output which is forwarded to a QoS Multiplexor, which dispatches packets to the air interface with the required QoS adjusted based on an input from said resource table.

27. The QLP of claim 26, wherein said QoS Multiplexor generates a QLP protocol data unit (PDU) for transmission over said air interface, wherein said PDU is a fixed size PDU, which is N time a base size of a QLP packet that provides efficient voice over IP transmission.

28. The QLP of claim 27, wherein said PDU comprises a priority indicator, wherein said priority indicator is determined based on a plurality of QoS characteristics from among: user's overall QoS class; application's QoS requirements; current data transmission condition; and scheduler feedback.

29. The QLP of claim 28, further comprising means for providing a QLP packet count in place of data octets count as a sequence number for said packets.

30. The QLP of claim 20, further comprising means for allocating multiple QLPs per data stream.

31. A Quality of Service (QoS) Link Protocol for use in a wireless telecommunications network comprising:
a plurality of data inputs, each for receiving packet data streams from applications over an IP network, wherein each application has at least one Quality of Service (QoS) associated therewith;
transmission confirmation receiving means for receiving an indication from a mobile terminal whether data transmitted thereto has been successfully transmitted;
a plurality of automatic retransmission request (ARQ) units each coupled to both an input for a separate packet data stream and to said transmission confirmation receiving means, said ARQ units for transmitting each packet and retransmitting each packet if the packet was not transmitted successfully; and a QoS multiplexor for receiving a data stream from each ARQ and adding header data to each packet for identifying physical layer treatment for each packet in accordance with the QoS associated with the data stream and current network characteristics of the network.

* * * * *